United States Patent
Wang et al.

(10) Patent No.: US 7,972,051 B2
(45) Date of Patent: Jul. 5, 2011

(54) DOUBLE-SIDED BACKLIGHT AND ASSEMBLY INCORPORATING A DOUBLE-SIDED LIGHT SOURCE COUPLING LIGHT GUIDE

(75) Inventors: Andrew Wang, Libertyville, IL (US); Sen Yang, Palatine, IL (US); Zhiming Zhuang, Kildeer, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 277 days.

(21) Appl. No.: 11/534,063

(22) Filed: Sep. 21, 2006

(65) Prior Publication Data

US 2008/0074899 A1   Mar. 27, 2008

(51) Int. Cl.
*F21V 7/04* (2006.01)
(52) U.S. Cl. .......... 362/613; 362/26; 362/606; 362/618; 362/620; 362/626; 349/65
(58) Field of Classification Search .......... 362/26, 362/602, 606, 613, 618, 620, 626; 349/65
See application file for complete search history.

(56) References Cited

U.S. PATENT DOCUMENTS

| 4,737,896 | A * | 4/1988 | Mochizuki et al. | 362/301 |
| 6,554,440 | B2 * | 4/2003 | Umemoto | 362/610 |
| 2002/0064037 | A1 | 5/2002 | Lee | |
| 2003/0063456 | A1 | 4/2003 | Katahira | |
| 2003/0234897 | A1 * | 12/2003 | Ozawa | 349/65 |
| 2004/0042233 | A1 * | 3/2004 | Suzuki et al. | 362/561 |
| 2004/0095740 | A1 | 5/2004 | Mai et al. | |
| 2005/0052383 | A1 | 3/2005 | Suzuki | |
| 2005/0195344 | A1 | 9/2005 | Chang et al. | |
| 2006/0187675 | A1 * | 8/2006 | Tseng et al. | 362/615 |

FOREIGN PATENT DOCUMENTS

| DE | 102004038344 A1 | 2/2005 |
| EP | 1538468 A | 6/2005 |

OTHER PUBLICATIONS

PCT Notification of Transmittal of the International Search Report and the Written Opinion of the International Searching Authority, or the Declaration, mailed Feb. 12, 2008, pp. 1-11, PCT/US2007/077616, European Patent Office.

* cited by examiner

*Primary Examiner* — Stephen F Husar
*Assistant Examiner* — Meghan K Dunwiddie
(74) *Attorney, Agent, or Firm* — Hisashi D. Watanabe; Joseph T. Cygan

(57) ABSTRACT

Described are a backlight, a backlight assembly for use in an electronic device and an electronic device configured to activate the backlight's first light source and to activate the backlight's second light source independently of one another. The described double-sided backlight may illuminate either the primary display or the secondary display. The disclosed backlight includes two light sources, each used to direct light in opposite directions from the double-sided backlight. The light guide of the backlight is configured to direct light from the first light source in a first direction to exit the light guide via its first face, and to direct light from the second light source in a second direction different from the first direction to exit the light guide via its second face.

17 Claims, 5 Drawing Sheets

DOUBLE-SIDED BACKLIGHT AND ASSEMBLY INCORPORATING A DOUBLE-SIDED LIGHT SOURCE COUPLING LIGHT GUIDE

FIELD

Described are a backlight, a backlight assembly for use in an electronic device and an electronic device including a backlight and more particularly backlights that are configured to activate a first light source and to activate a second light source independently of one another so that light exits from one face or the other face of the backlight's light guide.

BACKGROUND

In a foldable mobile communication device, a double-sided liquid crystal display device operates in both the active mode and the inactive mode. A foldable mobile communication device such as one having a clam shell form factor includes two housings. The first housing is the "transceiver" and the second housing is the "flip." When the device is in an open position and in the active mode, a primary display screen of the flip may be viewed by the user. When the device is in a closed position and in an inactive mode, the secondary display screen of the flip is viewed by the user. To reduce thickness, a shared light guide may be used by both displays, however, for conventional 2way light guides, both sides are simultaneously lit when a user views only one display screen at a time.

The makers of mobile communication devices, including those of cellular telephones, are increasingly adding functionality to their devices. For example, mobile communication devices such as cellular telephones include features such as still and video cameras, video streaming and two-way video calling, email functionality, Internet browsers, music players, FM radios with stereo audio and organizers. Cellular telephones in particular are becoming more than simply mobile communication devices. They are evolving into powerful tools for information management.

With the mobile communication devices' increased functionality, users are more likely to maintain power draws for extended periods of time. However, even though their functionality has increased, smaller devices are in demand by consumers. In the meantime, the power burden has outpaced battery technology. Unfortunately small batteries cannot store enough power to maintain functionality for extended periods of time. Accordingly, both a reduction in the power burden and a mobile communication device with a reduced size and/or more capacity for additional features would be beneficial.

DETAILED DESCRIPTION

Figure 1:
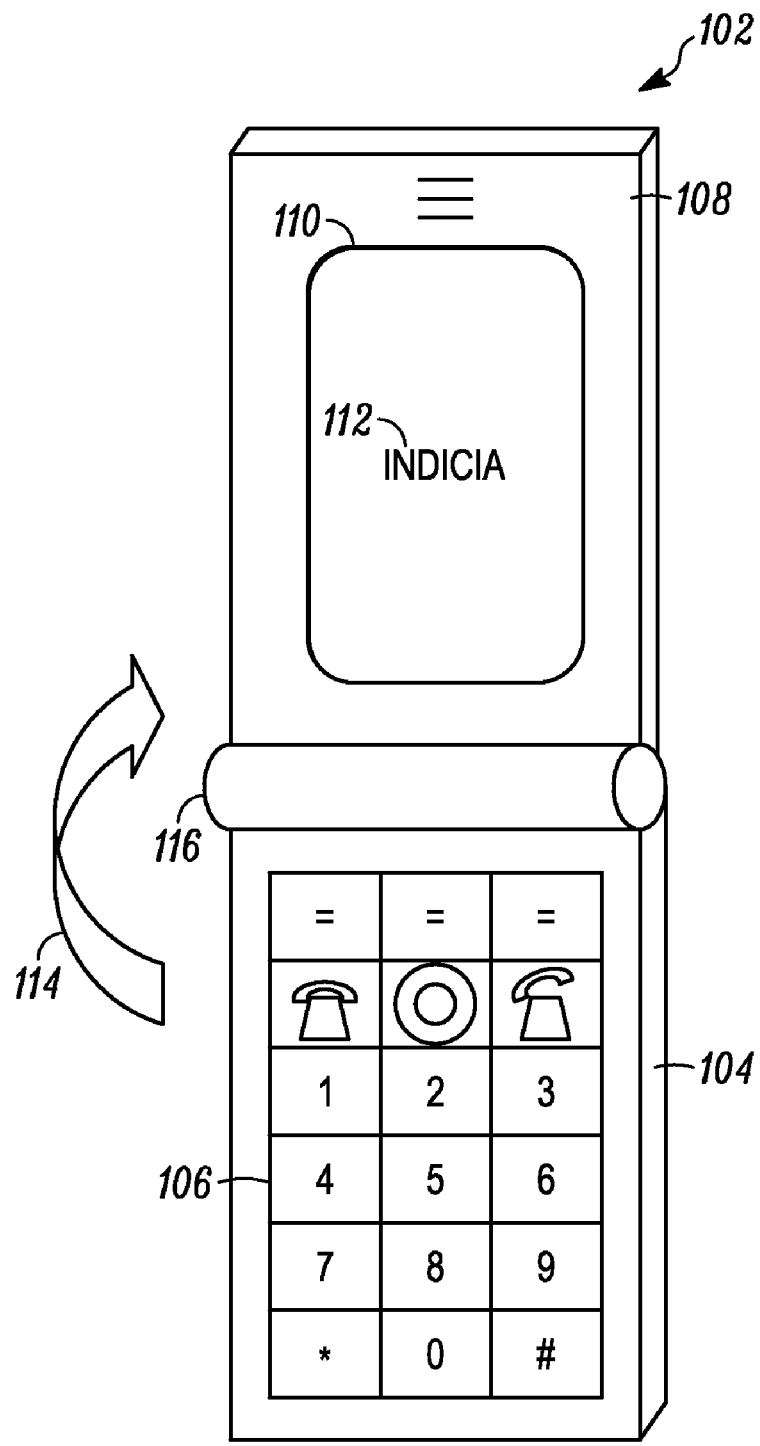
FIG. 1 shows a foldable mobile communication device that includes two housings in an open position according to an embodiment.

Described are a backlight, a backlight assembly for use in an electronic device and an electronic device configured to activate the backlight's first light source and to activate the backlight's second light source independently of one another. The described double-sided backlight may activate either the primary display or the secondary display. Since a lone light source consumes less power than two light sources, there may be a reduction of the power burden over traditional double-sided backlights with simultaneous activation.

The disclosed backlight includes two or more light sources, and a light guide used to direct light in opposite directions from the double-sided backlight. That is, the light guide is configured to direct light from the first light source in a first direction to exit the light guide via its first face, and to direct light from the second light source in a second direction different from the first direction to exit the light guide via its second face. A single light guide, such as those described below, may direct light in opposite directions depending upon the positions of the two light sources. In this way, a backlight assembly having a single light guide panel may have a reduced size.

The instant disclosure is provided to further explain in an enabling fashion the best modes of making and using various embodiments in accordance with the present invention. The disclosure is further offered to enhance an understanding and appreciation for the invention principles and advantages thereof, rather than to limit in any manner the invention. The invention is defined solely by the appended claims including any amendments of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Some of the functionality related to the various embodiments disclosed herein may require software programs or instructions and integrated circuits (ICs) such as application specific ICs, and may require coordination with other various software programs or instructions operational within a mobile communication device for example, for displaying the indicia on the display operating in a manner corresponding to the position of the housings. It is expected that one of ordinary skill, when guided by the concepts and principles disclosed herein will be readily capable of generating such software instructions and programs and/or ICs with minimal experimentation. Therefore, in the interest of brevity and minimization of any risk of obscuring the principles and concepts according to the various embodiments herein disclosed, further discussion of such software and ICs, if any, will be limited to the essentials sufficient to facilitate understanding by one of ordinary skill.

FIG. 1 shows a foldable mobile communication device 102 that includes two housings. In the open position, the "transceiver" or first housing 104 may include a keypad 106, and the "flip" or second housing 108 may include the primary display screen 110. Indicia 112 may be displayed on the primary display screen. When the device is in an open position and in the active mode, the primary display screen 110 of the flip may be utilized. In active mode, communication may be carried out on the device. The device may be opened and closed 114, for example by a hinge 116.

Figure 2:
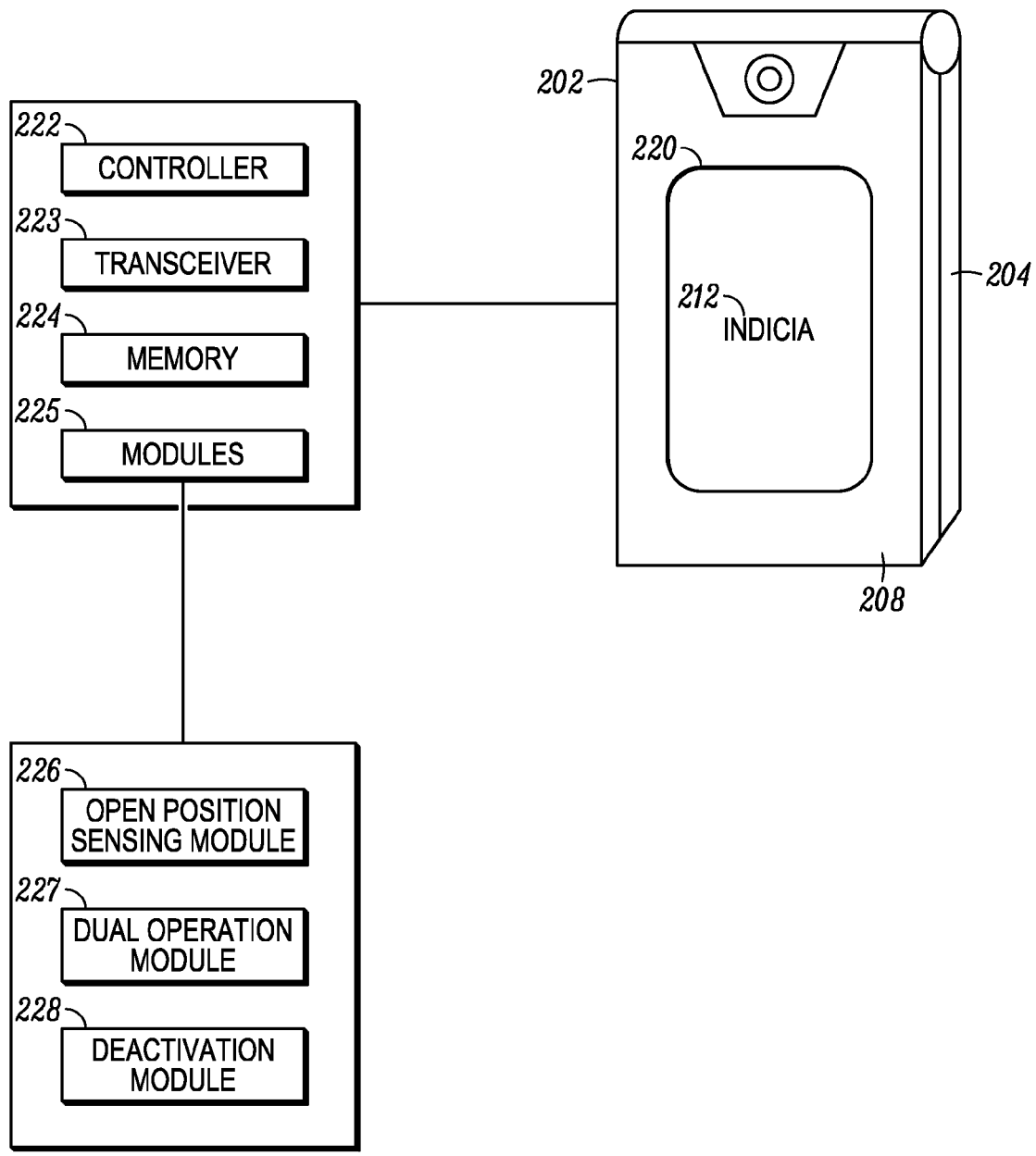
FIG. 2 shows a foldable mobile communication device in a closed position according to an embodiment.

FIG. 2 shows a foldable mobile communication device 202 in a closed position. In the closed position, the "transceiver" or first housing 204 is parallel to the "flip" or second housing 208, and the two housings contact one another along portions of a face of each housing. In a closed position, the device may be in inactive mode. When the device is in closed position the secondary display screen 220 of the flip 208 may be utilized and may display indicia 212. The primary display screen 110 (see FIG. 1) and the secondary display screen 220 share a backlight.

While FIGS. 1 and 2 illustrate a mobile communication device 102 and 202, a mobile communication device may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

FIG. 2 further illustrates a controller 222, a transceiver 223, memory 224 and modules 225. An open position sensing module 226, a dual operation module 227, and a deactivation module 228 are also depicted. The modules may carry out certain processes of the methods as described herein. The modules may be implemented in software, such as in the form of one or more sets of prestored instructions in memory 224, and/or hardware, which may facilitate the operation of the mobile station or electronic device as discussed below. The modules may be installed at the factory or may be installed after distribution by, for example, a downloading operation. The operations in accordance with the modules will be discussed in more detail below.

Figure 3:
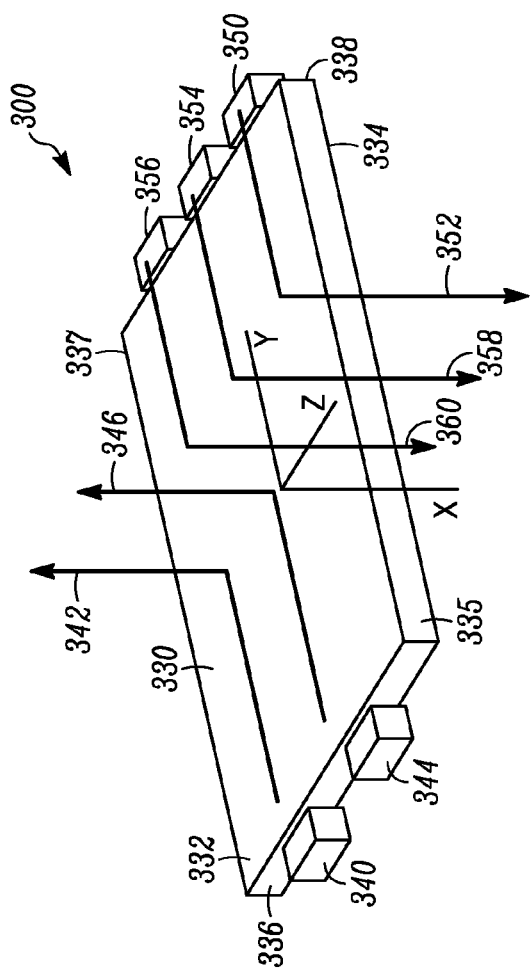
FIG. 3 depicts an embodiment of a double-sided backlight that includes a double-sided light guide.

FIG. 3 depicts one embodiment of a double-sided backlight 300. The double-sided backlight 300 includes a double-sided light guide 330. The light guide 330 has a first face 332, a second face 334, and at least a first side surface 336 and a second side surface 338. The first face 332 may direct light to the primary display screen 110 (see FIG. 1) and the second face 334 may direct light to the secondary display screen 220 (see FIG. 2).

A first light source 340 is located proximal the first side surface 336 and a second light source 350 is proximal the second side surface 338. The light guide 330 is configured to direct light from the first light source 340 in a first direction 342 to exit the light guide 330 via the first face 332. The light guide 330 is further configured to direct light from the second light source 350 in a second direction 352 different from the first direction 342 to exit the light guide 330 via the second face 334. The three-dimensional coordinate system x-y-z illustrates the directions of the light exiting the light guide 330.

The light sources 340 and 350 may be positioned proximal adjacent side surfaces. For example, a light source may be proximal side surface 335 that is adjacent the side surface 336. On the other hand, a light source may be proximal side surface 337 that is adjacent the side surface 338. It is understood that the light sources 340 and 350 may be proximal any two different side surfaces. Moreover, the light guide 330 may be any shape so that there may be fewer side surfaces or more side surfaces than depicted in FIG. 3. Side surfaces furthermore, may be curved. For example, a single side surface of a circular light guide may include two light sources 340 and 350 positioned, for example, oppositely or at a ninety degree angle from one another. It is understood that the term side surface is meant to include portions of side surfaces that may be continuous like that of a circular light guide, or may be particularly long.

The double-sided back light 330 provides light in at least two directions so that the primary display screen 110 (see FIG. 1) and the secondary display screen 220 (see FIG. 2) share the backlight 300. FIG. 3 further depicts sets of light sources. For example, light source 340 may be adjacent one or more light sources 344 to produce light 346. Additionally, light source 350 may be adjacent one or more light sources 354 and 356 to produce light 358 and 360 respectively. Light emitting devices, such as a first and second set of light sources which may be a set of Light Emitting Diodes (LEDs), Cold Cathode Fluorescent Lamp (CCFL) or other lamps or light sources are referred to as 340 and 350, and their respective light output directions are 342 and 352. The first and second light sources may be the same or different types. It is understood that any arrangement of two or more light sources proximal two or more side surfaces of the light guide is within the scope of the present disclosure.

The light sources 340 and 350 are independently driven. As illustrated, the output light 342 and 352 from each light source 340 and 350 is diverted in opposite directions depending on the position of the light source. When one light source is lit, at least a majority of the light may be guided in a first direction, for example to illuminate the primary display screen 110 (see FIG. 1). When another light source is lit, at least a majority of the light may be guided in a second direction, for example to illuminate the secondary display screen 220 (see FIG. 2). Since the light sources 340 and 350 are independently driven, there may be a reduction in the power burden of the device 102 (see FIG. 1). Accordingly, power may be saved by not driving both light sources at once if only one display 110 or 220 needs to be back lit, for example when the mobile communication device is in an open position or in a closed position, then either the primary display screen 110 or the secondary display screen 220 will be backlit, respectively.

The double-sided light guide 330 of FIG. 3 bends or funnels the light to the respective displays in the various embodiments. As will be discussed below, a light guide 330 has a microstructure directing light out of one or the other faces 332 or 334 of the light guide 330 depending upon the direction of the source of the light. The microstructures of a single double-sided light guide 330 may allow for thinner designs and therefore a device with a reduced size or more capacity for additional features. Accordingly, the light guide 330 may be approximately between 0.05 mm and 4.00 mm in thickness.

Figure 4:
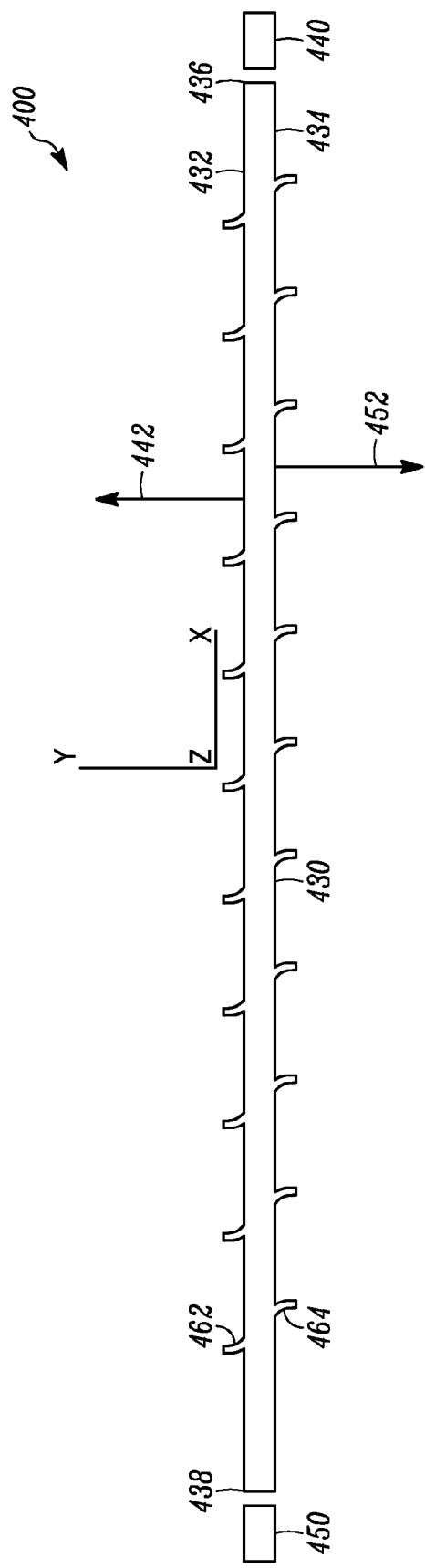
FIG. 4 illustrates an embodiment of a backlight with a light guide including microstructures.

FIG. 4 illustrates one embodiment of a backlight 400 with a light guide 430 including microstructures 462 and 464 configured to bend or funnel light in at least two different directions. Microstructure 462 may direct light from the first light source 440 in a first direction 442 to exit the light guide 430 via the first face 432. Microstructure 464 may direct light from the second light source 450 in a second direction 452 different from the first direction to exit the light guide 430 via the second face 434. The microstructures 462 and 464 are depicted as being on the surfaces 432 and 434 of the light guide 430 respectively. Microstructures may also be internal to the light guide 430 as will be discussed below. It is understood, in an embodiment, that some of the microstructures may be internal and some external to the light guide 430, as well. The microstructures, internal and external, may be configured in any manner that drives the light from a light source so that it predominantly exits one face or the other face.

The microstructures 462 and 464 may be a protrusion from the surfaces 432 and 434 respectively. While illustrated as sparsely populated on the surfaces 432 and 434, there may be hundreds or thousands of microstructures 462 and 464 on the surfaces. The shape or shapes of the microstructures form a first prismatic structure 462 on the first face 432 that bends light 442 coming from the first side surface 436 of the light guide 430 towards the first direction 442. The shape or shapes of the microstructures form a second prismatic structure 464 on the second face 434 that bends light coming from the second side surface 438 of the light guide 430 towards the second direction 452. It is understood that the microstructures may be a single shape or a plurality of shapes combined. It is further understood that the light guide 430 may be of a material having a single refractive index or it may be of a material or materials having a plurality of refractive indices. While the direction of the light 442 and 452 is depicted in one direction, the light may be dispersed in a plurality of directions away from each face so that the average direction is at least approximately that which is depicted.

Figure 5:
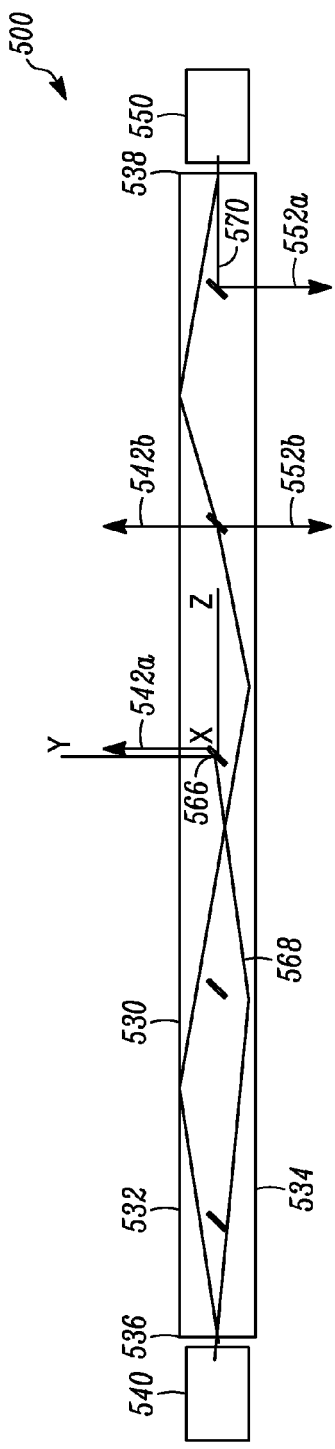
FIG. 5 depicts an embodiment of a light guide including a first material with a first refractive index and one or more internal structures of a second material with a second refractive index.

FIG. 5 illustrates another embodiment of a backlight 500 including a double-sided light guide 530 including internal structures. The light guide 530 has a first face 532, a second face 534, and at least a first side surface 536 and a second side surface 538. The first face 532 may direct light to the primary display 110 (see FIG. 1) and the second face 534 may direct light to the secondary display 220 (see FIG. 2).

FIG. 5 further depicts a light guide 530 including a first material with a first refractive index and one or more internal structures 566 of a second material with a second refractive index, the second refractive index different from the first refractive index. The depicted light guide of FIG. 5 is primarily the first material. The internal structure 566 is configured to direct light 568 from the first light source 540 to exit the light guide 530 in a first direction 542a via the first face 532. The internal structure 566 and others like it are further configured to direct light 570 from the second light source 550 to exit the light guide 530 in a different direction 552a via the second face 534.

Figure 6:
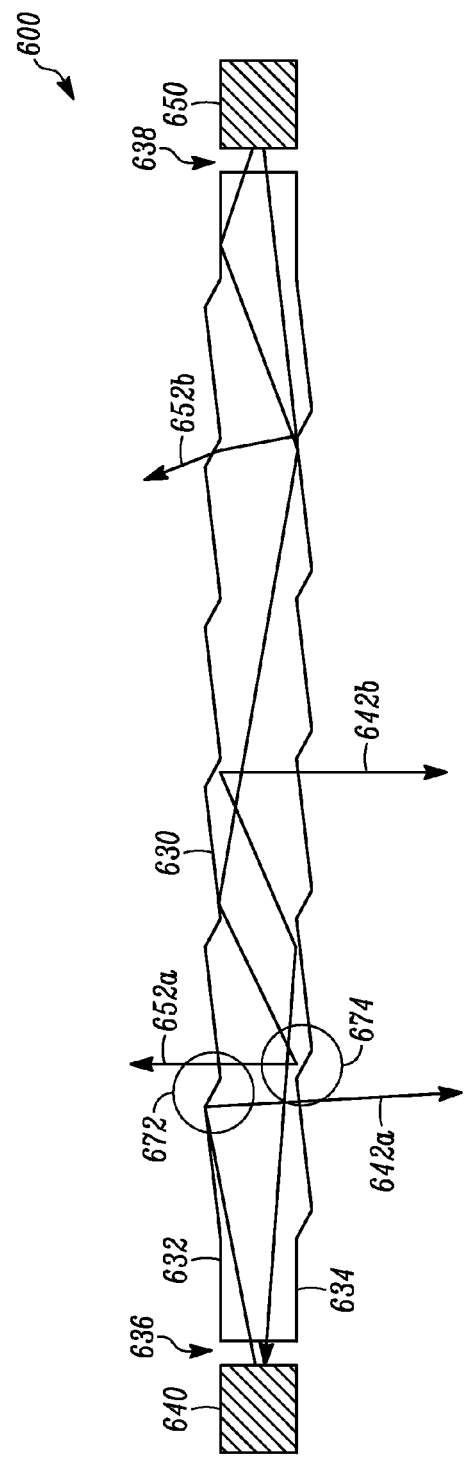
FIG. 6 illustrates another backlight embodiment where the light may be directed internally by contours of the surface to exit one or the other face of the light guide.

As discussed above, the light sources 540 and 550 may be independently driven. FIG. 5 further depicts the situation where both the first light source 540 and the second light source 550 are lit simultaneously, so that light may exit the first face 532 in a direction 542b at the same time light may exit the second face 534 in a direction 552b. Accordingly, the light sources may be independently driven or driven simultaneously. FIG. 6 illustrates another embodiment such as backlight 600 where the light may be directed internally to exit one face of the light guide 630 or the other face of the light guide 630. The contour 672 of the surface 632 is configured to direct light from the first light source 640 to exit the light guide 630 via the first face 634 in direction 642a and/or 642b. The contour 674 of the surface 634 is configured to direct light from the second light source 650 to exit the light guide 630 via the second face 632 in direction 652a and/or 652b. The contour may be any suitable configuration. A film on the surfaces 632 and 634 may also direct light out of the opposite surface. It is understood that any combination of one or more prismatic structures, internal structures, varying refractive index, surface contours, and thin films may be used to direct light out of opposite faces depending upon the light source of the described double-sided light guide. For example, in another embodiment, the first face and/or the second face may include a plurality of sub-surfaces having small relative angles to one another.

Figure 7:
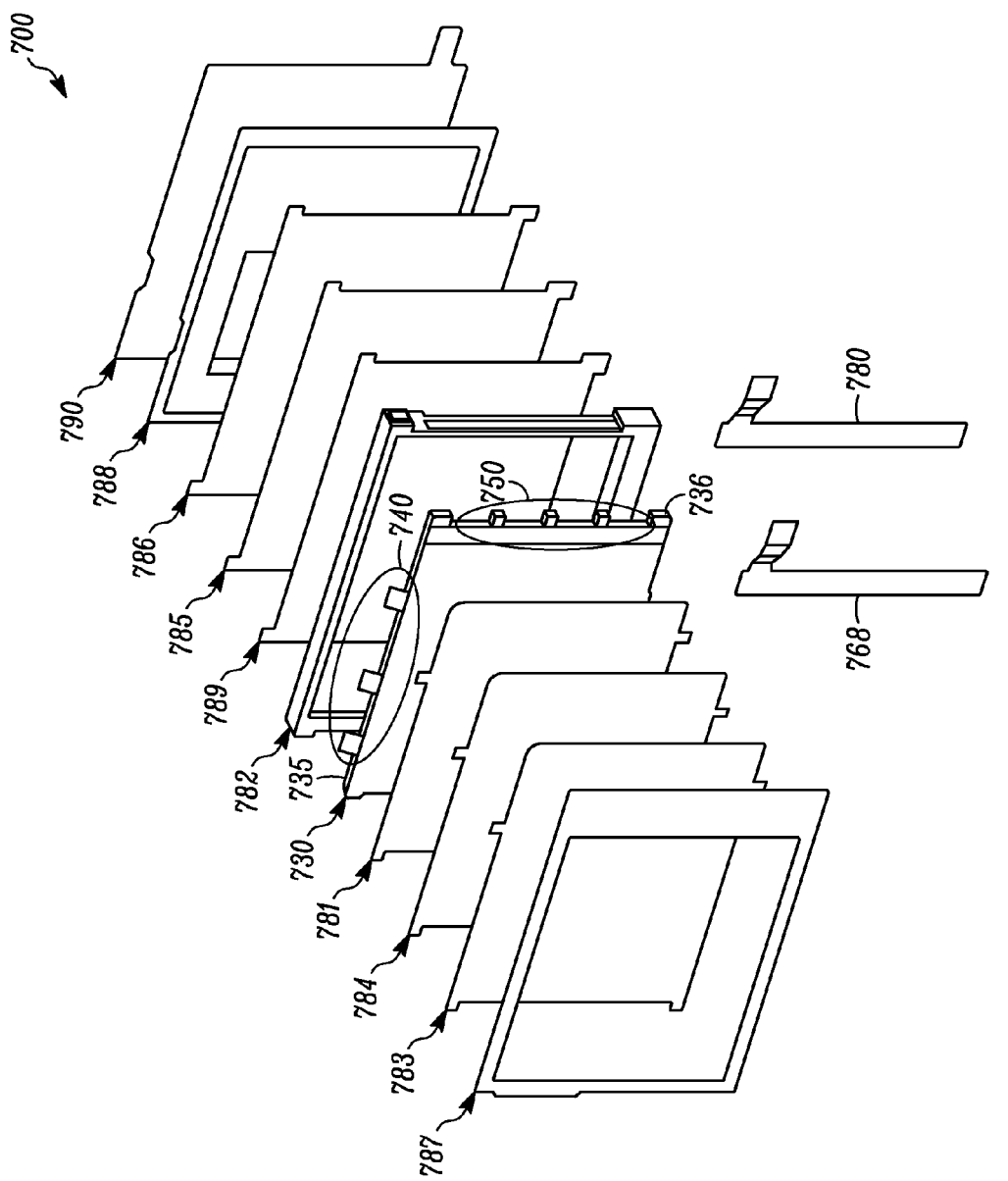
FIG. 7 depicts a backlight assembly according to an embodiment that may incorporate the backlights of FIG. 4, FIG. 5 and FIG. 6 as well as any variations thereof.

FIG. 7 depicts a backlight assembly 700 that may incorporate the above-described backlights 400 (see FIG. 4), 500 (see FIG. 5) and 600 (see FIG. 6) as well as any variations thereof. Backlight 730 is illustrated in FIG. 7 as including two sets of LEDs, 740 and 750 proximal to adjacent side surfaces 735 and 736. They are independently driven by a controller 222 (see FIG. 2) of the device 202. A first display 110 (see FIG. 1) may be coupled to the controller 222 and a second display 220 may be coupled to the controller 222. The controller 222 is configured to activate the first light source 740 and to activate the second light source 750 independently of one another. A first flex 768 and a second flex 780 may couple the light sources 740 and 750 to the controller 222, respectively. To independently drive the light sources 740 and 750 any suitable LED driver may be used, such as that of NATIONAL SEMICONDUCTOR LM2796.

A plastic frame 782 may hold the backlight assembly 700. An assembly may include brightness enhancement films (BEF) 783, 784, 785 and 786, one or more diffusers 781, a light guide panel 730 as described herein, two sets of white LEDs 740 and 750, and a plurality of LED flexes 768 and 780, masking tape 787, frame 782, reflector 788 and/or transflector 789, and a liner 790. It is understood that the assembly described here is by way of example.

The mobile communication devices 102 (see FIG. 1) and 202 (see FIG. 2) are shown as having a clam shell form factor. When the device is in an open position, the primary display screen 110 may be illuminated. When the device is in a closed position, the secondary display screen 220 may be illuminated. In the closed position, indicia such as the time of day, the date and the prevailing signal strength may be displayed. When a user receives a call, the secondary display screen 220 may include indicia referring to the incoming call. To commence communication with a caller, the user may place the device in its open position, therefore causing the secondary screen to discontinue illumination, while causing the primary screen to activate illumination.

A closed to open position sensing module 226 may signal the controller to switch power from a light source to a second light source, or vice versa. A dual operation module 227 may send a signal to the controller to switch power to both the first light source and the second light source. A deactivation module 228 may send a signal to the controller to discontinue power to one or both of the light sources. When the independently driven primary and the secondary display screens are not illuminated simultaneously, the power burden of device may therefore be reduced.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

The invention claimed is:

1. A backlight, comprising:
   a light guide having a first face, a second face, and at least a first side surface and a second side surface;
   a first light source proximal the first side surface; and
   a second light source proximal the second side surface;
   wherein the light guide comprises a first material with a first refractive index and internal structures comprising a second material with a second refractive index different from the first refractive index; and wherein the internal structures are configured to direct light from the first light source in a first direction to exit the light guide via the first face, and to direct light from the second light source in a second direction substantially opposite the first direction to exit the light guide via the second face.

2. The backlight of claim 1, wherein the first side surface is adjacent the second side surface.

3. The backlight of claim 1, wherein the first side surface is substantially opposite the second side surface.

4. The backlight of claim 1, wherein the first light source comprises a set of light emitting devices.

5. The backlight of claim 1, wherein the first light source and the second light source are independently controlled.

6. The backlight of claim 1, wherein the light guide has a thickness approximately between 0.05 millimeter and 4.0 millimeters.

7. The backlight of claim 1, wherein the first face or the second face include a plurality of sub-surfaces having small relative angles to one another.

8. A device comprising:
at least one housing;
first and second display screens supported by the at least one housing;
first and second light sources supported by the at least one housing;
a light guide supported by the at least one housing, the light guide having a first face, a second face, a first side surface and a second side surface,
wherein the first face is capable of directing light to the first display screen and the second face is capable of directing light to the second display screen;
wherein the light guide comprises a first material with a first refractive index and internal structures comprises a second material with a second refractive index different from the first refractive index;
wherein the internal structures are configured to direct light from the first light source in a first direction to exit the light guide via the first face, and to direct light from the second light source in a second direction substantially opposite the first direction to exit the light guide via the second face; and
wherein the first light source is proximal the first side surface and the second light source is proximal the second side surface.

9. The device of claim 8, further comprising:
a controller supported by the at least one housing;
a transceiver supported by the at least one housing;
a memory supported by the at least one housing; and
at least one module supported by the at least one housing.

10. The device of claim 9, wherein the at least one module includes at least one of an open position sensing module, a dual operation module, or a deactivation module.

11. The device of claim 8, wherein:
the at least one housing includes a first housing and a second housing; and
in a closed position, the first housing is parallel to the second housing and the first and second housings contact one another along portions of a face of each housing.

12. The device of claim 8, wherein the first side surface is adjacent the second side surface.

13. The device of claim 8, wherein the first side surface is substantially opposite the second side surface.

14. The device of claim 8, wherein the first light source comprises a set of light emitting devices.

15. The device of claim 8, wherein the first light source and the second light source are independently controlled.

16. The device of claim 8, wherein the light guide has a thickness approximately between 0.05 millimeter and 4.0 millimeters.

17. The device of claim 8, wherein the first face or the second face include a plurality of sub-surfaces having small relative angles to one another.

* * * * *